United States Patent [19]

Fiener

[11] Patent Number: 4,926,623

[45] Date of Patent: May 22, 1990

[54] MOWING APPARATUS

[75] Inventor: Josef Fiener, Mindelheim, Fed. Rep. of Germany

[73] Assignee: Karl Mengele & Söhne Maschinenfabrik und Eisengiesserei GmbH & Co., Guenzburg/Donau, Fed. Rep. of Germany

[21] Appl. No.: 179,472

[22] Filed: Apr. 8, 1988

[30] Foreign Application Priority Data

Apr. 13, 1987 [DE] Fed. Rep. of Germany ....... 3712507

[51] Int. Cl.⁵ ............................................. A01D 45/02
[52] U.S. Cl. ............................................ 56/60; 56/94; 56/119; 56/156; 56/503
[58] Field of Search ................. 56/53, 94, 96, 102, 56/119, 156, 503, 60, 41

[56] References Cited

U.S. PATENT DOCUMENTS

| | | | |
|---|---|---|---|
| 716,552 | 12/1902 | Jolly et al. | 56/96 |
| 1,054,256 | 2/1913 | Taylor | 56/53 X |
| 3,443,369 | 5/1969 | Sweegers | 56/503 X |
| 4,236,369 | 12/1980 | Decoene | 56/60 |
| 4,291,523 | 9/1981 | Cools | 56/94 |
| 4,594,842 | 6/1986 | Wolters et al. | 56/60 X |
| 4,771,592 | 9/1988 | Krone et al. | 56/119 X |

FOREIGN PATENT DOCUMENTS

| | | | |
|---|---|---|---|
| 2848451 | 5/1979 | Fed. Rep. of Germany | 56/94 |
| 2900552 | 7/1979 | Fed. Rep. of Germany | 56/60 |
| 3226876 | 1/1984 | Fed. Rep. of Germany | . |
| 3406551 | 9/1985 | Fed. Rep. of Germany | 56/119 |
| 3618825 | 12/1987 | Fed. Rep. of Germany | 56/53 |
| 2369785 | 7/1978 | France | 56/94 |

Primary Examiner—Hoang C. Dang
Attorney, Agent, or Firm—Toren, McGeady & Associates

[57] ABSTRACT

A mowing apparatus for mowing stalk-like crops independently of rows and for conveying the mowed crop to a draw-in-box of a chopper, including two rotating mowing rollers with rigid entrainment fingers, the mowing rollers being arranged laterally in front of the draw-in-box of the chopper, and two rotating wipe-off-rollers provided with wipe-off-fingers and cooperating with the mowing rollers by overlapping of the tip paths of the entrainment fingers and of the wipe-off-fingers, wherein the entrainment fingers are hook-shaped and inclined forward with respect to the radial direction and the wipe-off-fingers having a greater circumference velocity than the entrainment fingers.

3 Claims, 2 Drawing Sheets

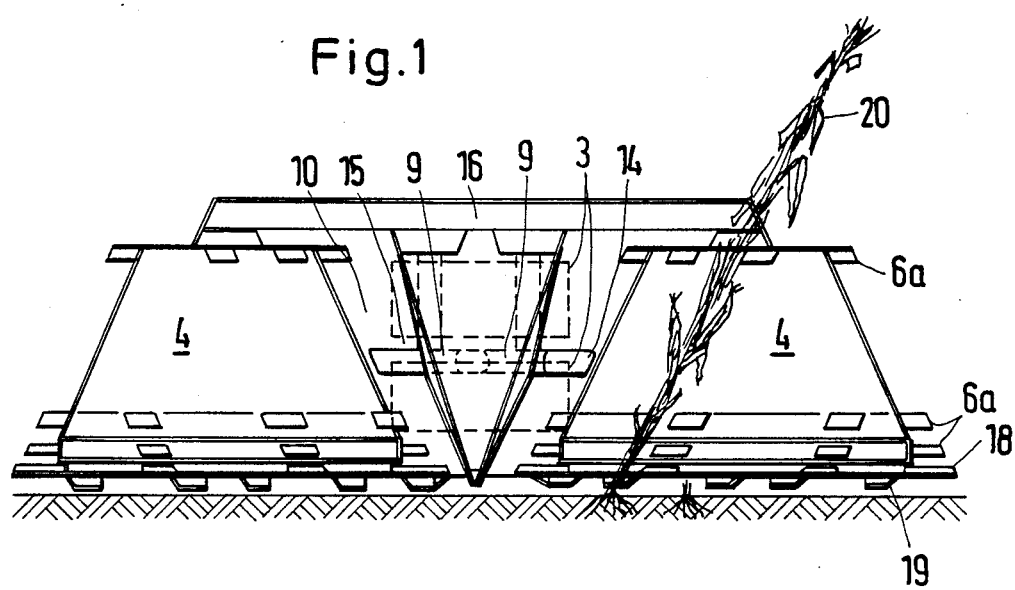
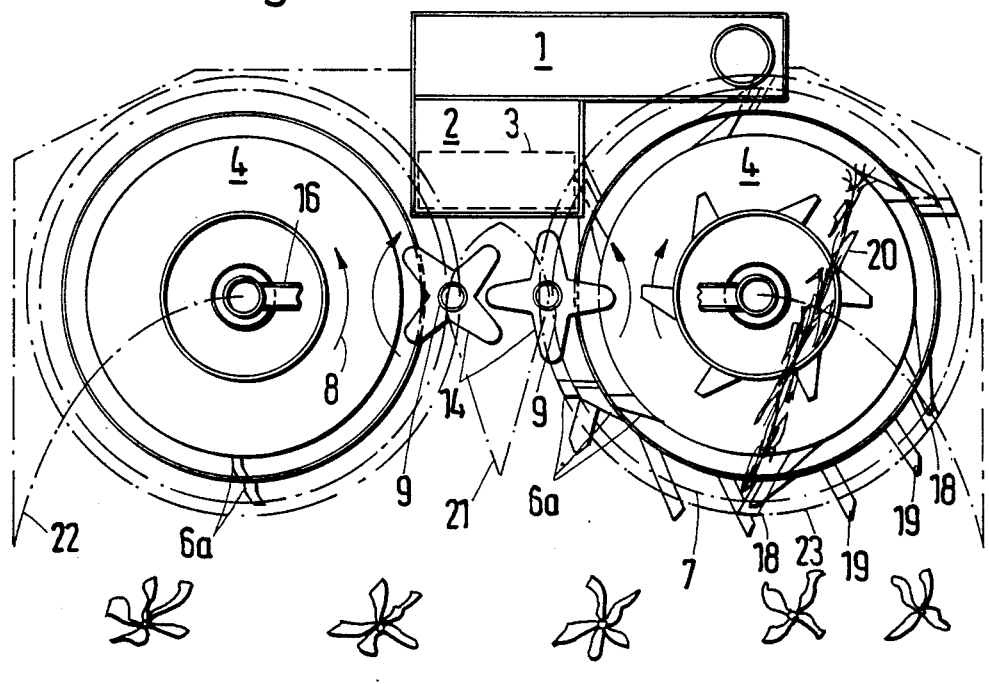

MOWING APPARATUS

BACKGROUND OF THE INVENTION

The invention is directed to a mowing apparatus for mowing of stalk-like harvest commodities especially corn, the mowing being performed independently of rows whereby the mowed crop is conveyed to a chopper through draw-in rollers arranged in a draw-in box. Several rotating mowing rollers with rigid entrainment devices are assigned to the draw-in box and cooperate with additional rollers due to overlapping of tip paths of the respective entrainment devices.

Such a mowing apparatus is known from the DE-OS 32 26 876, wherein four mowing- and feed or draw-in rollers are arranged across a working width of approximately three meters. The outer mowing- and feed or draw-in rollers guide herein the mowed harvest commodity in a wide arc at first towards the outside along a compartmentation arc supporting the cut-off stalks towards the inner mowing and draw-in roller, which then further conveys the outer stalks by means of long radial entrainment devices together with the inner stalks. Herein guides constitute a respectively separate draw-in channel, in which the stalks of the outer draw-in roller are kept separate from those of the inner draw-in roller. These guides concentrically embracing the draw-in and mowing rollers assume the support of the stalks during their conveyance especially when transmitting the stalks to the inner roller.

Apart from the long conveyance travel because of the redirection towards the external side, the increased construction cost is disadvantageous, since each compartmentation or separation tip must be equipped with the guidance brackets respectively projecting beyond the next separation or compartmentation tip. Furthermore, it is disadvantageous that because of the shown twin flow conveyance, the external mowing roller is arranged far from the inner mowing roller and thus in case of a longer working period there results a high nose heaviness and a large overhang towards the front.

Furthermore, a mowing apparatus is known from the DE-OS 34 06 551, in which the rigid entrainment devices have been replaced by controlled entrainment fingers. This permits operation without countersupports for the mowed cornstalks, since these can be sufficiently well retained in the hook-shaped entrainment devices during the lateral conveyance and are released for the transfer to the draw-in box.

Also, in this case, the increased constructional expense for the plurality of bearing points for the swivelable tines is disadvantageous, as well as the far forward overhang of the draw-in drum in case of greater working widths.

SUMMARY OF THE INVENTION

Therefore, the invention is based upon the task of providing a mowing apparatus of the above-mentioned type which assures a rapid and dependable transfer and forwarding of the harvested stalks to the chopper while having at the same time a simple and compact construction.

This task is solved by outer mowing rollers of the rotating mowing rollers having entrainment devices which are inclined forward in the revolving direction of the rollers, and the additional roller is a wipe-off roller having wipe-off fingers.

Because of the forwardly inclined shape of the entrainment devices the stalks are securely grasped and conveyed laterally to the chopper. In the overlapping region with the wipe-off roller the entrainment devices of the mowing roller are "overtaken" by the more rapidly revolving entrainment devices of the wipe-off roller and thus the stalks are removed from the entrainment hook and transferred to the draw-in rollers. Thus there results a rapid material flow without any considerable reorientations and without friction at guides of any sort, which precisely in case of the known solutions often can entail a dropping-out or tumbling of the cornstalks. By doing away with guides or directional controls there results furthermore a lower constructional cost and a shorter constructional length.

Since the harvested material is supplied to the chopper by the wipe-off rollers in two flow portions at the sides of the draw-in box, there results already with a twin drum embodiment an additional saving of structural length and weight, since the diameters of the mowing rollers at equal working widths can be chosen to be smaller particularly in the upper region because of the also laterally conveying effect of the wipe-off roller and thus the mowing rollers can extend with their lower largest diameter partially beneath the draw-in box and-/or the chopper.

In a further embodiment, the rotating mowing rollers having a conical, upwardly directed outer shape and rigid entrainment fingers. The wipe-off roller having a conical, downwardly directed outer shape so that, the upright corn plants are cut off with and are then brought into a rearwardly inclined position by the forward feed of the chopper, wherein they can support themselves against the conical outer surface. At the same time they are grasped by the entrainment devices which are preferably arranged in tandem in circumferential direction and conveyed to the chopper in the inclined position. Because of this the corn plants reach the draw-in rollers in the desired position through the sideways inclined draw-in channel, namely with the cutoff end first, wherein the cornstalks can be drawn-in directly and without a great change in direction in the sense of a good material flow.

The novel features which are considered as characteristic for the invention are set forth in parts in the appended claims. The invention itself, however, both to its construction and its method of operation, together with additional objects and advantages thereof, will be understood from the following description of specific embodiments when read in connection with the accompanying drawings.

BRIEF DESCRIPTION OF THE DRAWINGS

FIG. 1 a front view of a mowing apparatus with two mowing rollers and overhung wipe-off rollers FIG. 2 a plan view of FIG. 1

DETAILED DESCRIPTION OF THE PREFERRED EMBODIMENTS

Figure 3:
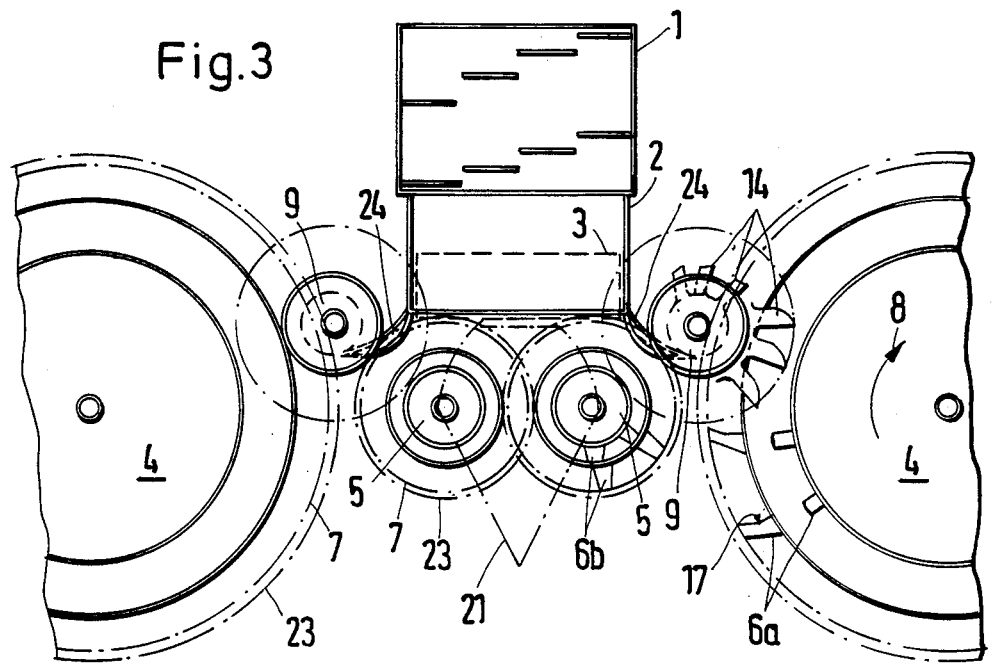
FIG. 3 a plan view of a mowing apparatus with four mowing rollers and two wipe-off rollers FIG. 4 a front view of the mowing device with four mowing rollers and two wipe-off rollers according to FIG. 3.

FIG. 1 shows a front view upon the horizontal draw-in rollers 3 (shown in broken lines), which are arranged in the draw-in box 2 of a chopper 1. The corn plants 20 to be harvested are cut off by the mowing rollers 4 by revolving cutters 18 in cooperation with fixed counterknives 19 and are further conveyed towards the center onto the chopper 1 by means of entrainment devices 6a. The entrainment devices 6a which are arranged in several, in this case three, planes of revolution herein support the cornstalk and fixedly retain it because of their inclined shape in the direction of revolution, in the manner of a hook.

Because of this shape directed forward compared to the radial direction, a wiping off at a metal plate or similar is not possible, there are provided wipe-off rollers 9, which revolve in the region of the draw-in channel 10 with a higher circumferential velocity than the mowing rollers. In view of this, the entrainment devices 6a are overtaken from behind by the entrainment devices 14 of the wipe-off roller 9 and thus are liberated from the retention of the entrainment devices 6a and are transferred to the draw-in rollers 3. Herein the lower stalk end is lifted approximately into the drawn-in gap 15 and a rapid draw-in operation is achieved by the higher circumferential velocity. The wipe-off rollers 9 are in this case supported in an overhung or cantilevered manner at the driving apparatus 16 and are adapted to the mowing rollers 4 as far as their external shape is concerned as well as being partially covered by the central separator partition 21.

FIG. 2 shows the central partition 21 and the edge partition 22 indicated in a double broken dotted line, as well as the driving apparatus 16 depicted partially exposed in the central region. In addition, the tip circle 7 of the hook-shaped lowermost entrainment devices 6a, as well as the somewhat larger cutter revolution circle 23 are depicted, beyond which the counterknives 19 which have pointed tips project.

Only two hook-shaped entrainment devices 6a are depicted at the lefthand side mowing roller 4 which revolve in two superposed planes, wherein the upper plane is arranged to be somewhat lagging in order to achieve an inclined position of the stalks.

FIG. 3 shows an embodiment form with a larger working width (the left side is only shown diagrammatically) with two outer mowing rollers 4 and two inner mowing rollers 5, between which respectively one wipe-off roller 9 is arranged. This wipe-off roller is preferably designed to have a conical shape downward, or their entrainment devices 14 have conical outer contours, while the mowing rollers 4 and 5 have a conical outer contour sloping upwards. The conical outer contour can herein be formed by the roller outer surface itself or also only by several entrainment rims 11a, 11b having different diameters, which are connected with each other by means of a rotational member especially by a cylinder 12. Contrary to FIGS. 1 and 2 the wipe-off rollers 9 do not in this case wipe-off by "overtaking" in direction of rotation 8 of the mowing roller 4, rather they rotate with somewhat higher circumferential speed opposite to the direction of rotation 8. For this purpose the entrainment devices 6a are preferably equipped with a circularly arc-shaped front entrainment face 17. Herein the length of the entrainment devices 14 correspond approximately to the lengths of the entrainment devices 6a, so that the cornstalk is securely removed from the entrainment device 6a and is immediately pressed into the tooth base of the entrainment devices 14 for assuring a secure support. The wipe-off roller 9 meshes simultaneously with the inner mowing roller 5, so that the cornstalks are further conveyed to this mowing roller, wherein the mowing roller 5 can again rotate faster than the wipe-off roller 9 to achieve a rapid material flow and a secure transfer. The inner mowing roller 5 and the wipe-off roller 9 have approximately radially or somewhat rearwardly oriented entrainment devices 6b or 14, in order to assure a jam-free wipe-off operation at wipe-off metal plates of the roof-shaped central partition 21 or at the inlet metal plate 24. Since the mowing roller 5 and wipe-off roller have a considerably smaller lateral conveyance travel than the outer mowing roller 4 this arrangement is possible without any difficulties. By this arrangement working widths with approximately five meters can be realized, wherein the outer mowing rollers 4 can be swiveled inwards for instance around the axis of the inner mowing roller 5 to enable road transport.

Figure 4:
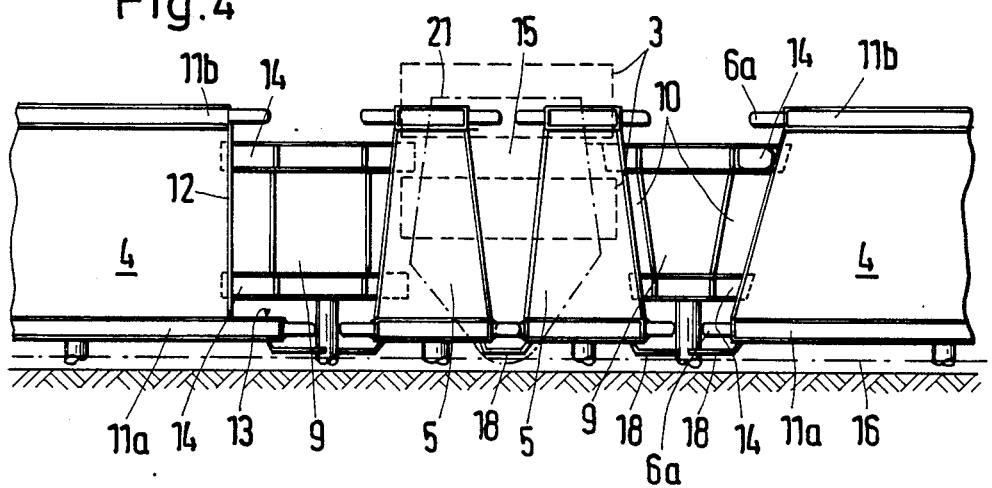

FIG. 4 shows a front view similar to FIG. 3, wherein in this case the wipe-off rollers 9 located nearest to the chopper overlap with the mowing rollers 4 and 5. Thus, the entrainment devices 14 of the wipe-off roller 9 convey the cornstalks from the outer mowing roller 4 as well as from the inner mowing roller 5 directly into the draw-in gap of the draw-in rollers 3, since the circumferential velocity of the wipe-off roller 9 can in a preferred embodiment be greater than that of the inner mowing roller 5, whereby a rapid material flow is achievable. Here both mowing rollers 4 and 5 are designed to be slightly conical upwards, wherein together with the wipe-off roller there results a sidewise inclined draw-in channel 10. The inner mowing roller 5 can equally be designed to be respectively conical downwards, wherein this mowing roller can simultaneously be configured as wipe-off roller 9.

I claim:

1. A mowing apparatus for moving stalk-like crops independently of rows and for conveying the mowed crop to a draw-in box of a chopper, comprising:
   rotatable mowing rollers each having a conical upwardly directed outer shape and rigid entrainment fingers which have tips which define a tip path during rotation of said mowing rollers; and
   rotatable wipe-off rollers each having a conical downwardly directed outer shape and wipe-off fingers which have tips which define a tip path during rotation of said wipe-off rollers, said wipe-off rollers cooperating with said mowing rollers by an overlapping of the tip paths of said entrainment fingers and said wipe-off fingers, said conically shaped mowing rollers and wipe-off rollers being arranged so as to form a sideways inclined draw-in channel in front of the draw-in box.

2. Mowing apparatus according to claim 1, wherein characterized the mowing rollers are formed by at least a lower entrainment rim (11a) of larger diameter and an upper entrainment rim (11b) of smaller diameter, wherein two entrainment rims (11a, 11b) are connected by a cylinder (12) in such a way that the lower entrainment rim (11a) constitutes a support surface (13).

3. A mowing apparatus for mowing stalk-like crops independently of rows and conveying the mode crop to a draw-in box of a chopper, comprising:
   four rotatable mowing rollers arranged side-by-side in front of the draw-in box of the chopper, each of said mowing rollers having entrainment fingers with tips which define a tip path during rotation of said mowing rollers;
   two rotatable wipe-off rollers each having wipe-off fingers with tips which define a tip passed during rotation of said wipe-off rollers, each of said wipe-off rollers being arranged between two of said mowing rollers so as to cooperate with said two mowing rollers by an overlapping of the tip paths of said entrainment fingers and said wipe-off fingers; and drive means for rotating said moving rollers and said wipe-off rollers so that said wipe-off fingers have a greater circumferential velocity than said entrainment fingers.

* * * * *